US006714491B1

(12) United States Patent
Ke et al.

(10) Patent No.: US 6,714,491 B1
(45) Date of Patent: Mar. 30, 2004

(54) WIRE-SUSPENDED OBJECTIVE LENS ACTUATOR STRUCTURE AND METHOD OF ASSIGNING CURRENT PATHWAYS THERETO

(75) Inventors: Chau-Yuan Ke, Pintung Hsien (TW); Li-Ding Wei, Taipei (TW); Ming-Feng Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 460 days.

(21) Appl. No.: 09/586,302

(22) Filed: Jun. 2, 2000

(30) Foreign Application Priority Data

Mar. 24, 2000 (TW) ........................................ 89105442 A

(51) Int. Cl.[7] .................................................. G11B 7/00

(52) U.S. Cl. ................................ 369/44.11; 369/53.19; 369/44.14; 369/44.32

(58) Field of Search ........................... 369/53.19, 44.32, 369/44.14, 44.15, 44.22, 112.29, 44.35, 44.25, 44.29, 44.41, 244, 44.11; 359/814, 813, 823, 824

(56) References Cited

U.S. PATENT DOCUMENTS 5,402,404 A * 3/1995 Saito ....................... 369/44.35
5,905,255 A * 5/1999 Wakabayashi et al. ... 369/44.22
6,295,255 B1 * 9/2001 Seo et al. ................ 369/44.32
6,449,229 B1 * 9/2002 Kim et al. ............... 369/53.19

* cited by examiner

*Primary Examiner*—William Korzuch
*Assistant Examiner*—Kim-Kwok Chu
(74) *Attorney, Agent, or Firm*—J. C. Patents

(57) ABSTRACT

A wire-suspended objective lens actuator structure and a method of assigning current pathways. The lens holder on the actuator structure has a group of focusing coils, a group of tracking coils and a group of slant adjustment coils. The coils are connected to four conductive wires. A first conductive wire controls the focusing coil and a second conductive wire controls the tracking coil. Similarly, a third conductive wire controls the slant adjustment coil. The ground terminals of all three groups of coils are connected in parallel to a fourth conductive wire. The fourth conductive wire serves as a common ground terminal. The control terminal of each group of coils is connected to a differential voltage-output current amplifier circuit or a differential voltage-output voltage amplifier circuit. Hence, the focusing, the tracking and the slant adjustment coils can be driven by differential voltages.

7 Claims, 7 Drawing Sheets

300

WIRE-SUSPENDED OBJECTIVE LENS ACTUATOR STRUCTURE AND METHOD OF ASSIGNING CURRENT PATHWAYS THERETO

CROSS-REFERENCE TO RELATED APPLICATION

This application claims the priority benefit of Taiwan application serial no. 89105442, filed Mar. 24, 2000.

BACKGROUND OF THE INVENTION

1. Field of Invention

The present invention relates to an objective lens actuator structure. More particularly, the present invention relates to a wire-suspended objective lens actuator structure and a method of assigning current pathways.

2. Description of Related Art

Most photosensitive recording/regenerating devices contain an optical pickup head. To operate a recording/regenerating device, a beam of laser from a light source is passed into the object lens of an optical pickup head. The light beam forms a focus point at the data layer inside an optical disk. On reflecting from the data layer, the laser beam is intercepted by the optical pickup head again so that embedded data on the optical disk is retrieved.

The actuator device that drives the optical pickup head has a lens holder. In order for the optical pickup head to access data on an optical disk, a focusing coil for controlling the focus and a tracking coil for controlling the tracking must be installed on the lens holder. Currents are passed into these two coils to produce driving power in the magnetic field so that focusing and tracking are in control. Since the lens holder is the target of control for the focusing and the tracking system, inappropriate suspension renders control of the lens holder very difficult. Hence, it is important to take note of the method of channeling current into the lens holder because the current-position transfer function is likely to be affected. Most wire-suspended actuator device utilizes the conductive wires to suspend the lens holder and to input currents.

FIG. 1 is a perspective view of a conventional wire-suspended objective lens actuator structure. FIG. 2 is a side view of the conventional wire-suspended objective lens actuator structure in FIG. 1. As shown in FIGS. 1 and 2, two U-shaped irons 101 are vertically erected on each side of a base plate 100. The vertical branch of the U-shaped irons 101 closer to the edges of the base plate 100 is referred to as the outer branch. Similarly, the vertical branch of the U-shaped magnetic irons 101 closer to the middle of the base plate 100 is referred to as the inner branch. Two magnetic blocks 102 are attached to the respective inner sides of the outer branches of the U-shaped irons 101 for generating magnetic fields that cause the lens holder 104 to float on the base plate 100. A focusing coil 106 and a tracking coil are attached to each side of the lens holder facing the U-shaped irons 101. The wires inside the focusing coil 106 runs around in a plane that are parallel to the base plate 100. The inner branch of the U-shaped irons 101 passes through the center of the respective focusing coil 106 assembly. On the other hand, the wires inside the tracking coil 108 runs around in a plane that are perpendicular to the base plate 100. The tracking coils 108 are positioned between the magnetic block 102 and the inner branch of the U-shaped irons 101. The lens holder 104 is suspended over the base plate 100 through the control wire 110 of the focusing coil 106, the control wire 112 of the tracking coil 108, the ground wire 114 of the focusing coil 106 and the ground wire 116 of the tracking coil 108.

FIG. 3 is a sketch of the assigned current pathways in a conventional wire-suspended objective lens actuator structure. Amongst the four conductive wires shown in FIG. 3, two conductive wires are used for controlling the focusing coil 106 and the other two conductive wires are used for controlling the tracking coil 108. Current flows into the focusing coil 106 via the control terminal 110 and emerges from the focusing coil 106 via the ground terminal 116. Similarly, current flows into the tracking coil 108 via the control terminal 112 and emerges from the tracking coil 108 via the ground terminal 116.

As data packing density inside an optical disk continues to rise, resolution of the optical reading system must also increase. Hence, desired perpendicularity between the light axis and the disk surface is correspondingly higher. To control the slant angle of the laser beam, an electrical servo system must be used. Otherwise, precision demanded by the optical system is so high that it is almost impossible to manufacture. In a conventional wire-suspended optical pickup head actuator structure, all four conductive wires are used up by the focusing coil and the tracking coil. Therefore, there is no wires left for installing slant adjustment coils.

SUMMARY OF THE INVENTION

Accordingly, one object of the present invention is to provide a wire-suspended objective lens actuator structure whose lens holder is able to bear not only a focusing coil for focusing and a tracking coil for tracking, but also a slant adjustment coil for adjusting the slant angle. The wire-suspended actuator structure can be applied to a high-density optical disk and a high-precision optical system. When the optical disk somehow moves away from the optical axis during spinning, the slant adjustment coil is able to adjust the lens holder so that the lens holder remains parallel to the optical disk. Hence, correct data can be read from the optical disk as usual.

To achieve these and other advantages and in accordance with the purpose of the invention, as embodied and broadly described herein, the invention provides a method for assigning current pathways to the wire-suspended actuator structure. Four conductive wires are used to control three sets of coils. Each of the three conductive lines is used for controlling the focusing coil, the tracking coil and the slant adjustment coil respectively. The fourth conductive wire is a common ground terminal for three sets of coils.

This invention also provides a wire-suspended objective lens actuator structure and a method of assigning current pathways such that the ground terminal of the original independent focusing coil and tracking coil are combined. The freed-up ground wire is used as a conductive wire that leads to one of the terminals of a slant adjustment coil. The other terminal of the slant adjustment coil is connected to the common ground terminal of the focusing and tracking coil. The control terminal of the focusing coil, the tracking coil and the slant adjustment coil are each connected to a differential voltage-output current amplifier circuit or to a differential voltage-output voltage amplifier circuit respectively. Using a small differential voltage, focusing, tracking and slant adjustment of the lens holder are possible.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
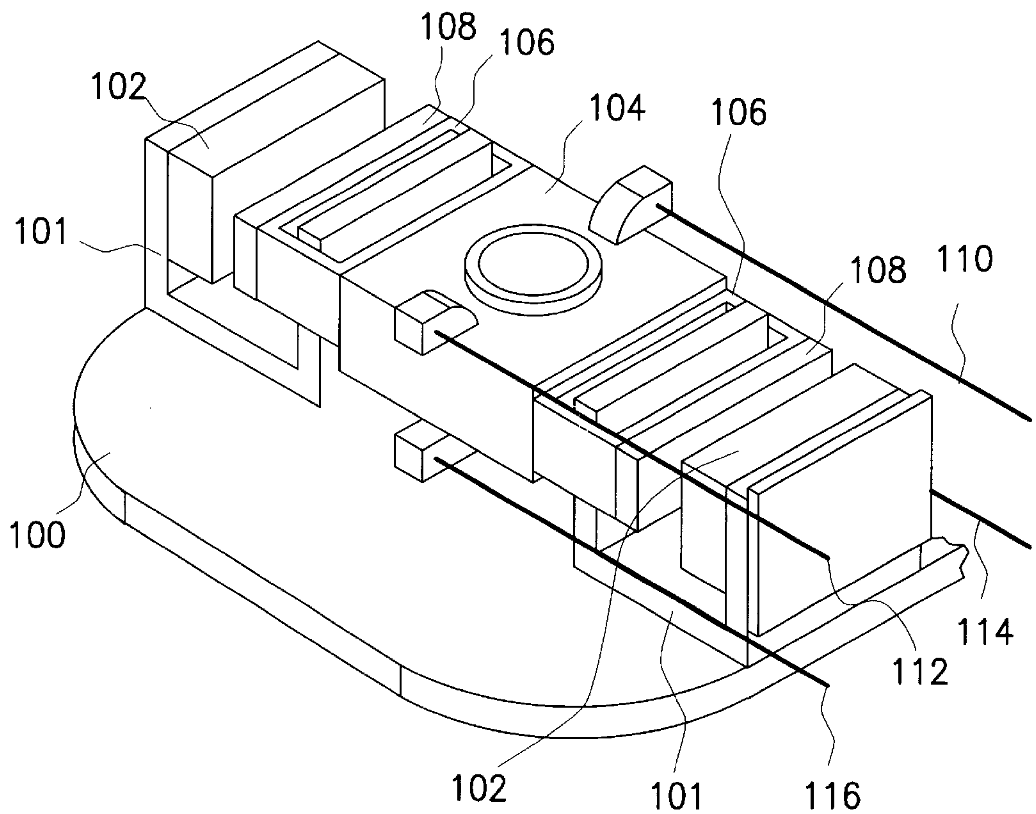
FIG. 1 is a perspective view of a conventional wire-suspended objective lens actuator structure.
Figure 2:
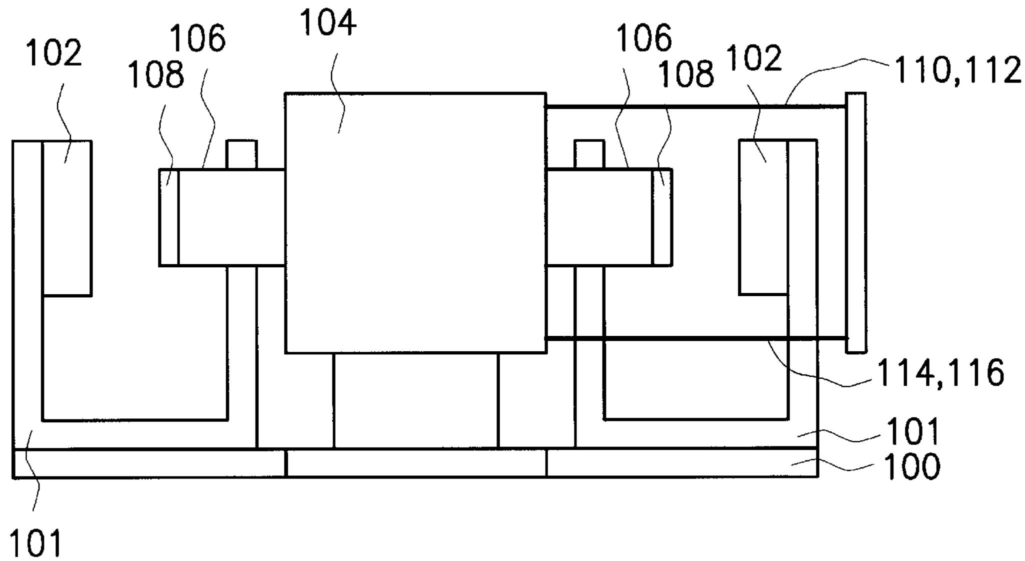
FIG. 2 is a side view of the conventional wire-suspended objective lens actuator structure in FIG. 1.
Figure 3:
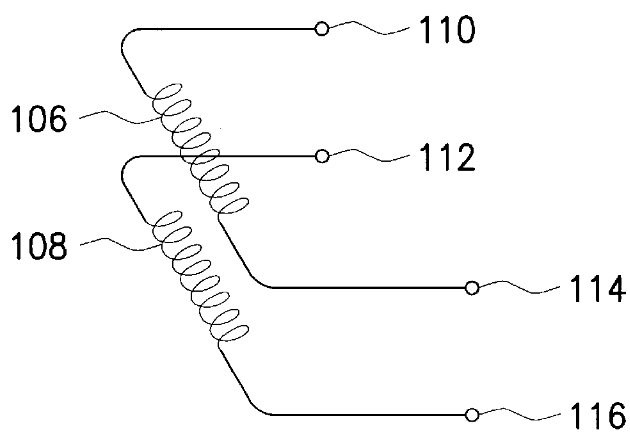
FIG. 3 is a sketch of the assigned current pathways in a conventional wire-suspended objective lens actuator structure.

Reference will now be made in detail to the present preferred embodiments of the invention, examples of which are illustrated in the accompanying drawings. Wherever possible, the same reference numbers are used in the drawings and the description to refer to the same or like parts.

Figure 4:
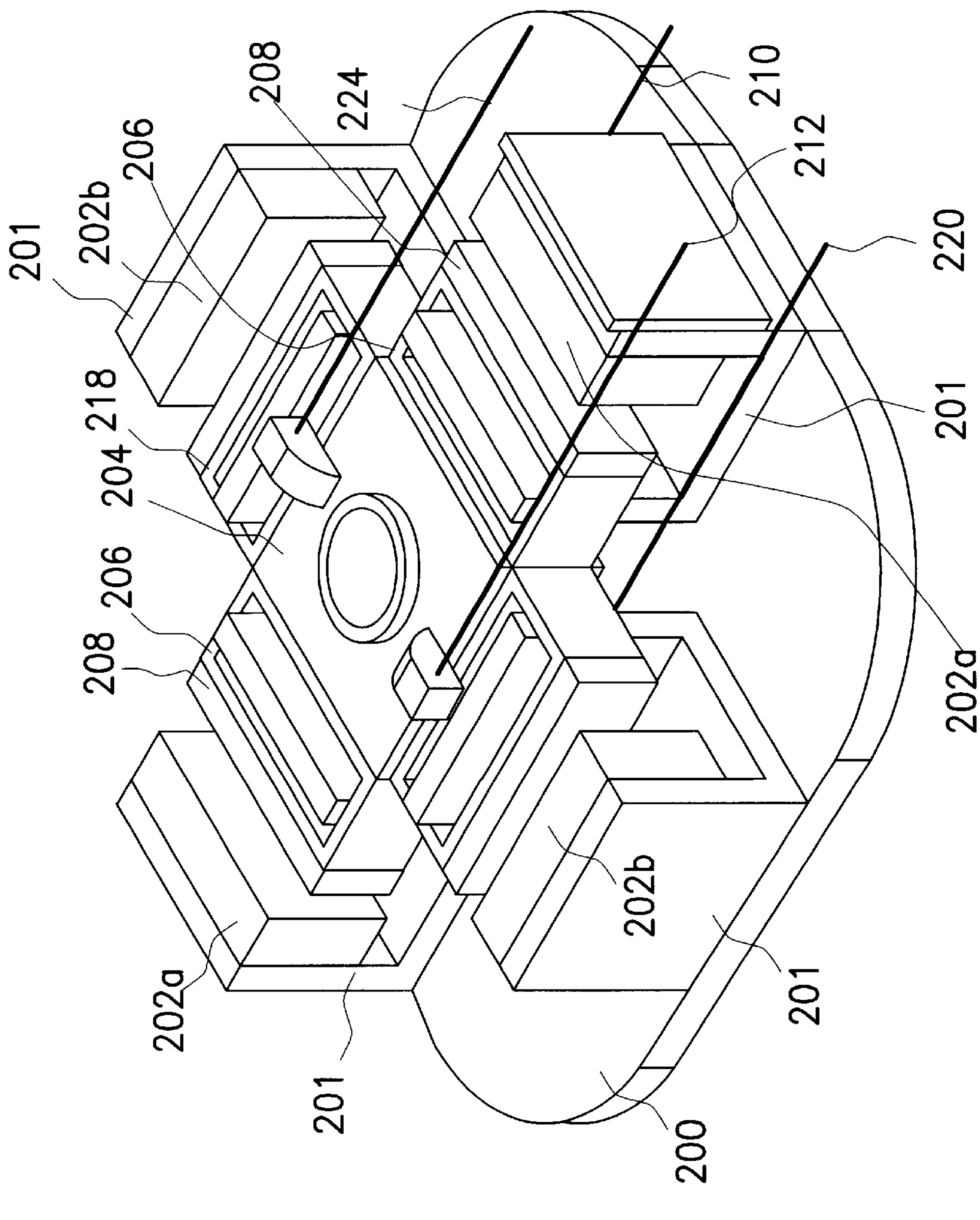
FIG. 4 is a perspective view of a wire-suspended objective lens actuator structure according to this invention.
Figure 5:
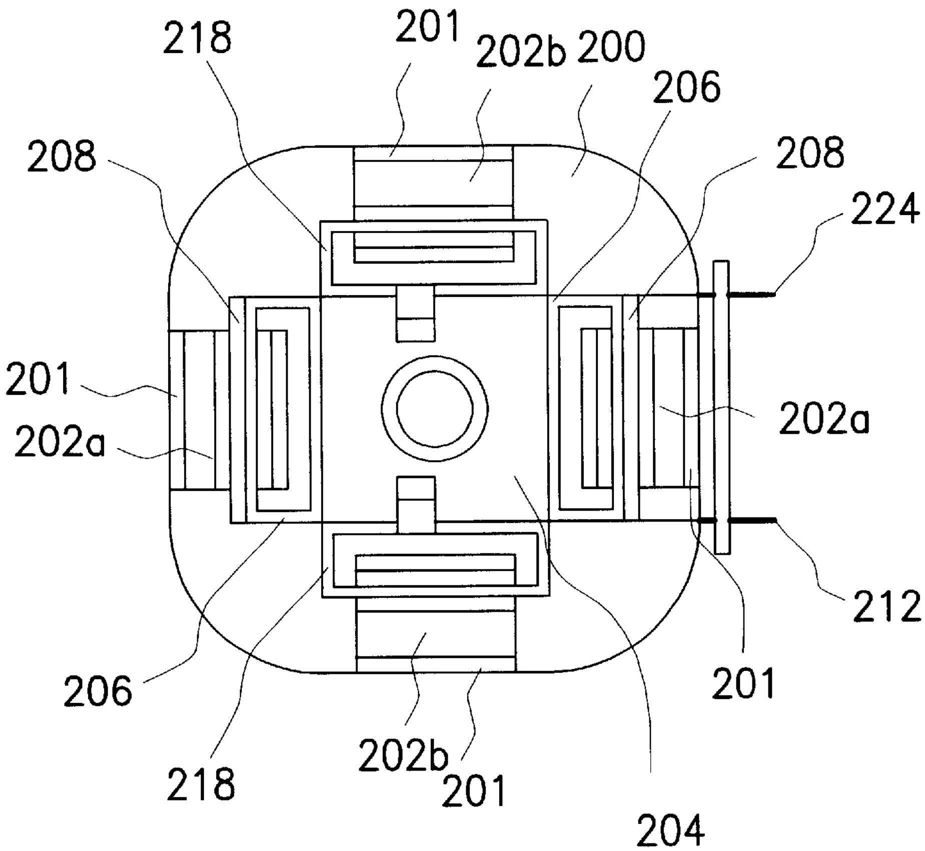
FIG. 5 is top view of the wire-suspended objective lens actuator structure in FIG. 4.

FIG. 4 is a perspective view of a wire-suspended objective lens actuator structure according to this invention. FIG. 5 is top view of the wire-suspended objective lens actuator structure in FIG. 4. As shown in FIGS. 4 and 5, four U-shaped irons 201 are vertically positioned on a base plate 200. The U-shaped irons occupy mutually perpendicular directions near the edges of the base plate 200. The vertical branch of the U-shaped irons 201 closer to the center of the base plate 200 is referred to as the inner branch. Similarly, the vertical branch closer to the edges of the base plate 200 is referred to as the outer branch. Four magnetic blocks are attached to respective inner surfaces of the outer branches of the U-shaped iron 201. Two magnetic blocks 202*a* are used for focusing and tracking while the other two magnet blocks 202*b* are used for adjusting slant angle. The two focusing and tracking magnets 202*a* are positioned on a pair of U-shaped irons 202 facing each other near the edges of the base plate 200. The two slant adjustment magnets 202*b* are positioned on another pair of U-shaped irons 202 facing each other again near the edges of the base plate 200. The four magnets together provide the necessary magnetic fields so that a lens holder 204 is able to float near the center of the base plate 200. The lens holder 204 is also suspended on top of the base plate 204 through a focusing coil control wire 210, a tracking coil control wire 212, a slant adjustment coil control wire 220 and a common ground wire 224. The conducting wire inside each focusing coil 206 and each slant adjustment coil 218 runs around in a plane parallel to the base plate 200. The inner branch of the U-shaped irons 201 pass through the focusing coils 206 and the slant adjustment coils 218 respectively. The two focusing coils 206 face each other on each side of the lens holder 204 in the direction where the control wires 210, 212, 220 and 224 are run. Together with the focusing and tracking magnets 202*a*, the focusing coils 206 control the focus. The two slant adjustment coils 218 also face each other on another pair of sides of the lens holder 204. Together with the slant adjustment magnets 202*b*, the slant adjustment coils 218 control the slant angle. The conducting wire inside each tracking coil 208 runs around in a plane perpendicular to the base plate 200. The tracking coils 208 are inserted between the focusing and tracking magnet 202*a* and the inner branch of the U-shaped iron 201. Each tracking coil 208 is attached to the focusing coil 206 on each side of the lens holder 204.

Figure 6:
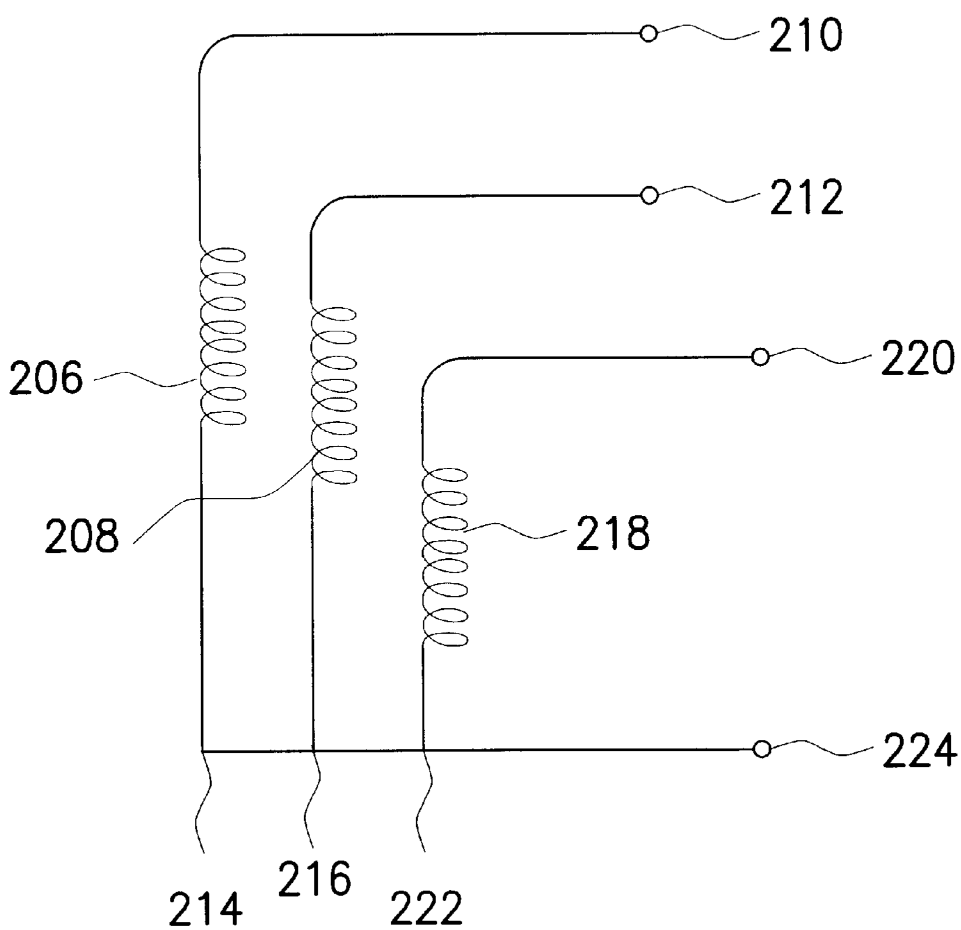
FIG. 6 is a sketch of the assigned current pathways in the wire-suspended objective lens actuator structure of this invention.

FIG. 6 is a sketch of the assigned current pathways in the wire-suspended objective lens actuator structure of this invention. Three conductive wires are connected to the focusing coil 206, the tracking coil 208 and the slant adjustment coil 218 respectively. The remaining conductive wire is connected to the other ends of the focusing coil 206, the tracking coil 208 and the slant adjustment coil serving as a common ground terminal 224. Current for controlling the focusing coil 206 flows into the coil from the control wire 210 and out through the common ground terminal 224. Similarly, current for controlling the tracking coil 208 flows into the coil from the control wire 212 and out through the ground terminal 224, and current for controlling the slant adjustment coil 218 flows into the coil from the control wire 220 and out through the ground terminal 224.

Figure 7A:
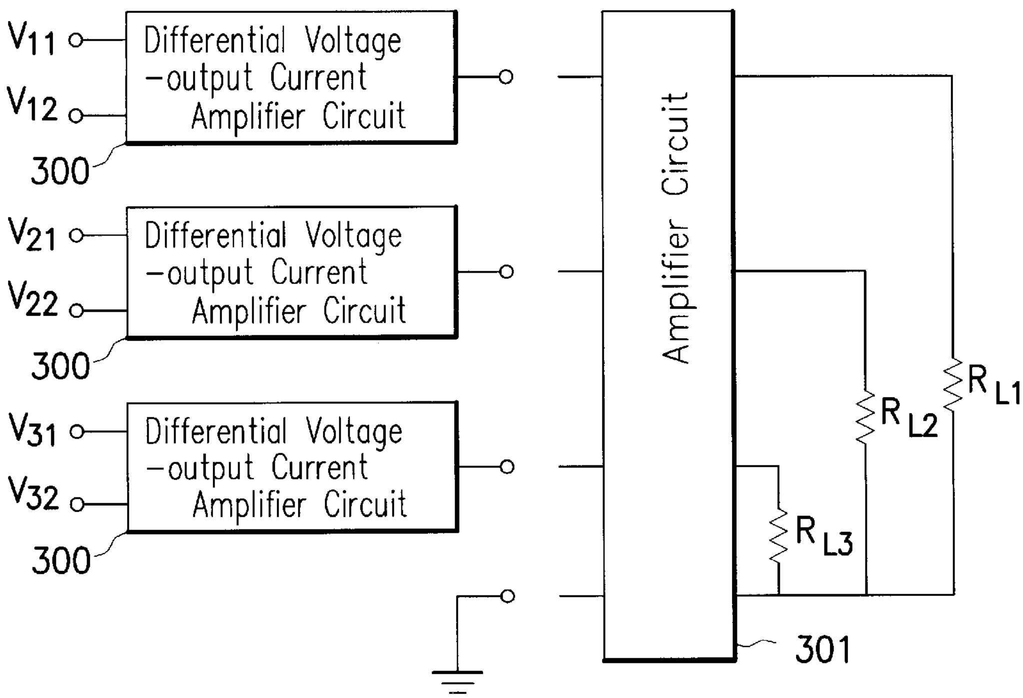
FIG. 7A is a block diagram showing a first method of assigning the current pathways to the wire-suspended objective lens actuator structure of this invention.

FIG. 7A is a block diagram showing a first method of assigning the current pathways to the wire-suspended objective lens actuator structure of this invention. The loads of the coils are $R_{L1}$, $R_{L2}$ and $R_{L3}$ respectively. The control terminal of each load resistor is connected to the amplifying circuit 301. The amplifying circuit 301 is in turn connected to individual differential voltage-output current amplifier circuits 300.

Figure 7B:
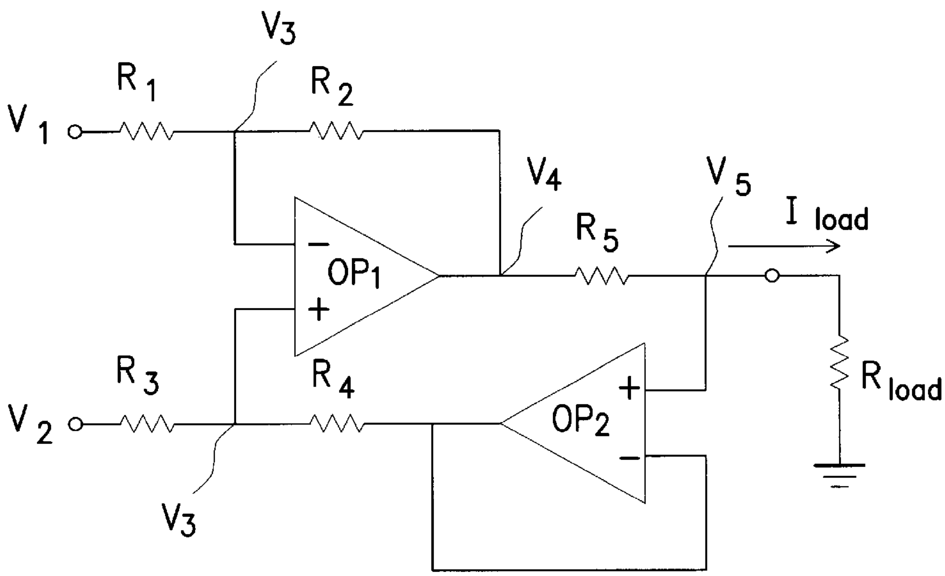
FIG. 7B is a diagram showing the differential voltage-output current amplifier circuit shown in FIG. 7A.

FIG. 7B is a diagram showing the differential voltage-output current amplifier circuit shown in FIG. 7A. Each differential voltage-output current amplifier circuit 300 includes two operational amplifiers OP1 and OP2 and five resistors R1, R2, R3, R4 and R5. According to the circuit arrangement, the following can be computed:

$$V4-V5=\left(\frac{R2}{R1}-\frac{R4}{R3}\right)V3+\left(\frac{R4}{R3}V2-\frac{R2}{R1}V1\right);$$

$$I_{load}=\frac{V4-V5}{R5}=\frac{\left(\frac{R2}{R1}-\frac{R4}{R3}\right)V3+\left(\frac{R4}{R3}V2-\frac{R2}{R1}V1\right)}{R5};$$

$$\text{if }\frac{R2}{R1}=\frac{R4}{R3},\text{ then }I_{load}=\frac{V2-V1}{R5}.$$

Hence, the load current depends only on the differential voltage (V2-V1) and is unaffected by load reactance.

Figure 8A:
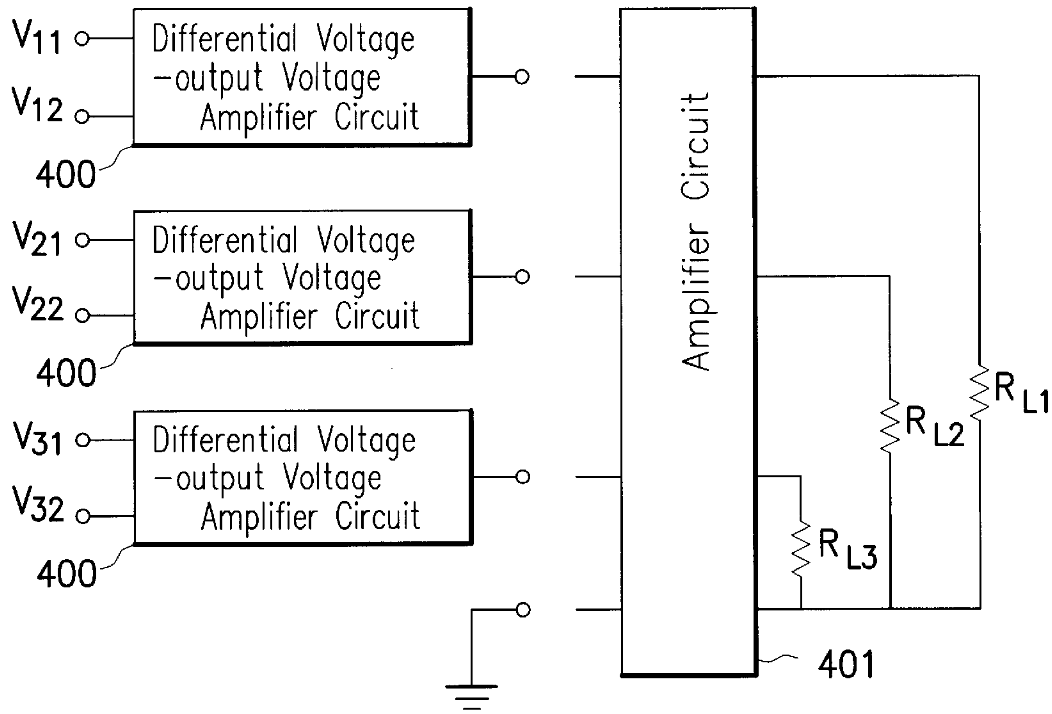
FIG. 8A is a block diagram showing a second method of assigning the current pathways to the wire-suspended objective lens actuator structure of this invention.

FIG. 8A is a block diagram showing a second method of assigning the current pathways to the wire-suspended objective lens actuator structure of this invention. The loads of the coils are $R_{L1}$, $R_{L2}$ and $R_{L3}$ respectively. The control terminal of each load resistor is connected to the amplifying circuit 401. The amplifying circuit 401 is in turn connected to individual differential voltage-output voltage amplifier circuits 400.

Figure 8B:
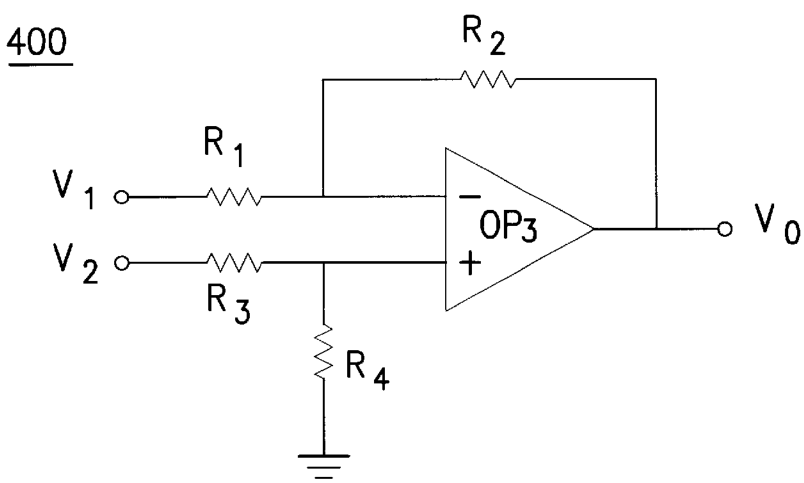
FIG. 8B is a diagram showing the differential voltage-output voltage amplifier circuit shown in FIG. 8A.

FIG. 8B is a diagram showing the differential voltage-output voltage amplifier circuit shown in FIG. 8A. Each differential voltage-output current amplifier circuit 400 includes an operational amplifier OP3 and four resistors R1, R2, R3 and R4. According to the circuit arrangement, the following can be computed:

$$V0=\frac{R2}{R1}\left[\left(1+\frac{R1}{R2}\right)\frac{V2}{1+\frac{R3}{R4}}-V1\right];$$

$$\text{if } \frac{R3}{R4}=\frac{R1}{R2},\quad \text{then } V0=\frac{R2}{R1}(V2-V1).$$

Hence, the output voltage depends only on the differential voltage (V2-V1).

In summary, four conductive wires are used to control three current pathways in this invention. Three conductive wires are used for controlling the focusing coil, the tracing coil and the slant adjustment coil respectively. In fact, (N+1) conductive wires can be used to control N current pathways. Hence, more flexibility and degree of freedom can be conferred to any system having multiple of controlling coils.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wire-suspended objective lens actuator structure, comprising:

a base plate;

a group of focusing and tracking magnetic iron assemblies facing each other with each assembly near a side edge of the base plate;

a group of slant adjustment magnetic iron assemblies facing each other with each assembly near an alternating side edge of the base plate;

a lens holder between the focusing/tracking magnetic iron assemblies and the slant adjustment iron assemblies floating above the base plate;

a group of focusing coils on the lens holder for focusing the lens holder with each focusing coil linking the group of focusing and tracking magnetic iron assemblies, wherein the conductive wire inside the focusing coil runs around in a plane parallel to the base plate, and the focusing coils are serially connected together to form a circuit with a first control terminal and a first ground terminal;

a group of tracking coils on the lens holder for tracking the lens holder with each tracking coil linking the group of focusing and tracking magnetic iron assemblies, wherein the conductive wire inside the tracking coil runs around in a plane perpendicular to the base plate, and the tracking coils are serially connected together to form a circuit with a second control terminal and a second ground terminal;

a group of slant adjustment coils on the lens holder for adjusting the slant angle of the lens holder with each slant adjustment coil linking the group of slant adjustment magnetic iron assemblies, wherein the conductive wire inside the slant adjustment coil runs around in a plane parallel to the base plate, and the slant adjustment coils are serially connected together to form a circuit with a third control terminal and a third ground terminal; and a common ground terminal connecting to the first, second and the third ground terminal.

2. The structure of claim 1, wherein the first control terminal is connected to the output terminal of a differential voltage-output current amplifier circuit.

3. The structure of claim 1, wherein the first control terminal is connected to the output terminal of a differential voltage-output voltage amplifier circuit.

4. The structure of claim 1, wherein the second control terminal is connected to the output terminal of a differential voltage-output current amplifier circuit.

5. The structure of claim 1, wherein the second control terminal is connected to the output terminal of a differential voltage-output voltage amplifier circuit.

6. The structure of claim 1, wherein the third control terminal is connected to the output terminal of a differential voltage-output current amplifier circuit.

7. The structure of claim 1, wherein the third control terminal is connected to the output terminal of a differential voltage-output voltage amplifier circuit.

* * * * *